United States Patent [11] 3,612,841

[72] Inventors Marion Kosem
 Willoughby Hills;
 Clive P. Hohberger, Shaker Heights, both of Ohio
[21] Appl. No. 840,778
[22] Filed July 10, 1969
[45] Patented Oct. 12, 1971
[73] Assignee Allen-Bradley Company
 Milwaukee, Wis.

[54] METHOD AND APPARATUS FOR FEEDRATE CONTROL OF SPINDLE-RELATED NUMERICAL CONTROL SYSTEMS
10 Claims, 5 Drawing Figs.
[52] U.S. Cl. .................................................235/151.11, 318/571
[51] Int. Cl. ...................................................... G05b 19/18
[50] Field of Search...........................................235/151.11, 151, 151.1; 318/571, 573, 574, 569, 568

[56] References Cited
UNITED STATES PATENTS

| | | | |
|---|---|---|---|
| 3,002,115 | 9/1961 | Johnson et al. | 318/571 (20.110) X |
| 3,246,125 | 3/1960 | Mergler | 318/571 (20.110) X |
| 3,286,085 | 11/1966 | Rado | 318/571 (20.110) X |
| 3,344,260 | 9/1967 | Lukens | 318/571 (20.110) X |
| 3,428,876 | 2/1969 | Kelling | 318/571 (20.110) |
| 3,430,035 | 2/1969 | Read | 318/571 (20.110) X |

Primary Examiner—Joseph F. Ruggiero
Attorneys—Arnold T. Ericsen and Richard C. Steinmetz, Jr.

ABSTRACT: In a numerical control system, a method and apparatus for controlling the feedrate of a machine tool as a function of spindle speed (angular velocity). A spindle encoder provides basic feedpulses at a frequency $f_o$ as a function of spindle speed. A feedrate generator multiplies the frequency $f_o$ by a factor derived from a programmed model velocity in inches per revolution (IPR) and the vectorial departure (D), or its reciprocal, derived from programmed departures along two axes. Thus vectorial velocity is maintained as a function of spindle speed.

3,612,841

METHOD AND APPARATUS FOR FEEDRATE CONTROL OF SPINDLE-RELATED NUMERICAL CONTROL SYSTEMS

BACKGROUND OF THE INVENTION

This invention relates to numerical control system, and more particularly to a method and apparatus for controlling feedrate as a function of spindle angular velocity.

In a typical numerical control system, a cutting tool is directed relative to a workpiece by specifying the desired departure of the tool from its present position with reference to two or three mutually orthogonal axes, $x$, $y$ and $z$. For optimum use of the system, the vectorial departure D should be traversed at a maximum velocity, where D is the square root of the sum of each of the departures X, Y and Z squared. That maximum velocity is dependent primarily on the nature of the cutting tool and the composition of the material. Therefore, velocity is usually an independent variable predetermined when a numerical control program is prepared to correlate with the anticipated cutting environment.

The desired velocity V (feedrate) is expressed either as a feedrate number (FRN) for each vectorial departure D, where FRN is equal to V divided by D, or as a modal velocity V if a feedrate computer is provided which effectively computes the FRN from the programmed velocity and departure values. In either case, a feedrate generator produces a pulse train at a frequency which is the product of the frequency of basic feed pulses and the factor FRN for he desired metal removal rate.

The metal removal rate is further dependent on other characteristics The the machining process such as depth and width of cut, chip thickness, type of cutter and the spindle speed. It is, of course, possible to take all of these characteristics into consideration at the time the machine-tool-directing program is prepared and stored on tape. However, if those characteristics do not remain constant, the task of preparing the program becomes more burdensome. The dependence on spindle speed is especially important in such machining applications as turning on a lathe. Accordingly, in such processes it is desirable to control feedrate as a function of spindle speed, thereby maintaining a constant vectorial velocity of a cutter through a workpiece independent of programmed changes in cutter position. One form of such control is in terms of cutter loading in inches per tooth of chip thickness removed per unit cutter advance, which in the case of turning operations, such as on a lathe, may be expressed as inches per revolution (IPR) of the spindle.

OBJECTS AND SUMMARY OF THE INVENTION

An object of the present invention is to provide a numerical control system which produces a relative rotary motion between cutting tool and a workpiece as a function of the angular velocity of a spindle with a desired modal velocity expressed in units of linear distance per revolution of the rotary motion, for a given distance of programmed motion, where the distance is the vectorial sum of programmed departure of the tool position relative to the workpiece.

Another object of the present invention is to provide a numerical control system for maintaining a desired vectorial velocity of a cutting tool through a workpiece dependent on the angular velocity of relative rotary motion between the tool and the workpiece and independent of programmed changes in machine tool position.

These and other objects of the invention are achieved by an arrangement wherein a spindle encoder produces a train of basic feedpulses at a rate proportional to spindle angular velocity. A feedrate generator multiplies that train of pulses by a factor which is equal to a ratio of desired velocity of a cutting tool (relative to a workpiece) to the vectorial distance the tool must travel during a machine cycle in response to programmed departures along one or more axes.

The novel features of the invention are set forth with particularity in the appended claims.

The invention will best be understood from the following description when read in conjunction with the accompanying drawings.

DESCRIPTION OF THE PREFERRED EMBODIMENT

Figure 1:
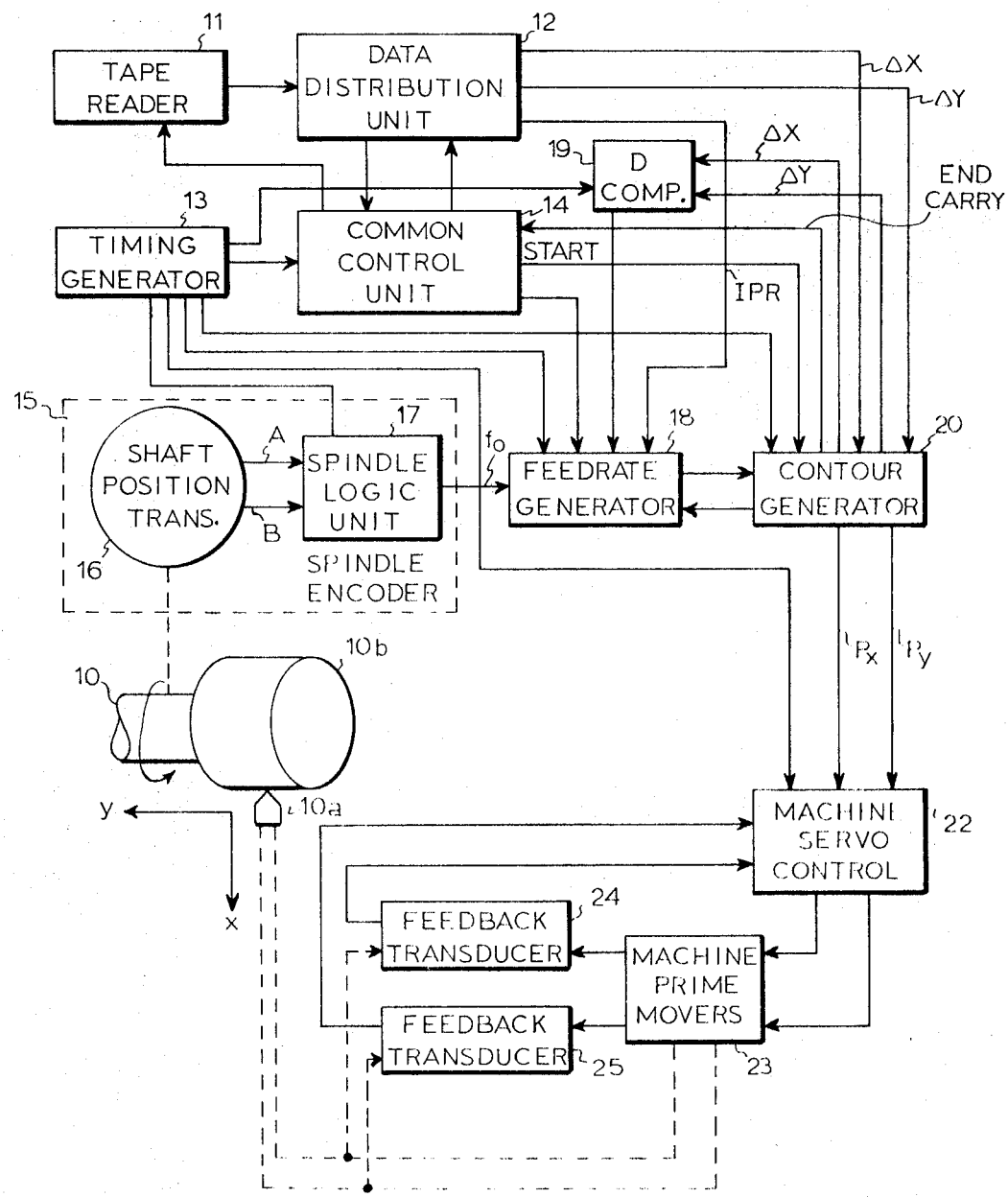
FIG. 1 is a block diagram of an embodiment of the present invention.

Attention is now called to FIG. 1 which illustrates the main portions of a numerical control system for a machine having a spindle 10 incorporating the present invention. The system includes a tape reader 11 for reading a control program describing coordinate departures along the machine tool axes. The program also includes coded words which designate control functions necessary for automatic operation of a machine tool with cutter 10a.

The command data to which the present invention relates is coded on the tape in blocks, each block representing a vectorial distance command in either absolute values X and Y or in incremental form $\Delta X$ and $\Delta Y$. If in the absolute form, a comparison is made between the command data and the present position of the machine tool 10a relative to a workpiece 10b being rotated by the spindle 10 to determine the increments the machine tool is to be moved along the various axes. Alternatively, if the data is in the incremental form, the command data is used to move the machine tool the specified increments from its present position. For the purpose of illustrating an embodiment of the present invention, it will be assumed that the command data along two orthogonal axes $x$ and $y$ is in the incremental form, but it should be understood that it may be in the absolute form, and that in either form it may be along three orthogonal axes.

Each block of command data will also include a feedrate word expressed either as a feedrate number (FRN) or as a modal velocity, such as inches per revolution (IPR). If the feedrate is expressed as a modal velocity, apparatus is required to effectively compute the feedrate number from the vectorial distance D the machine tool is to be moved in response to axis commands $\Delta X$ and $\Delta Y$ in order to control the vectorial velocity of the tool. In the embodiment to be described in greater detail with reference to FIGS. 4 and 5 it is assumed that feedrate is expressed as a modal velocity as inches per revolution (IPR) of the machine spindle 10.

The numerical control data is read a block at a time into a data distribution unit 12 where the data is decoded for subsequent distribution to proper units of the numerical control system. To illustrate the present invention, a two-axis control system will be described ($x$ and $y$); application of the present invention to a three-axis system will be obvious to those skilled in the art. Accordingly, the control data to be distributed by the unit 12 consists of axis commands in incremental form ($\Delta X$ and $\Delta Y$) and feedrate expressed as a modal velocity (IPR).

A timing generator 13 provides basic clock pulses to the entire numerical control system, while a common control unit 14 synchronized by the timing generator 13 provides timing signals to control the proper sequencing of operations throughout the numerical control system.

What has been described thus far is common to many numerical control systems. The primary improvement provided by the present invention in such numerical control systems comprises a spindle encoder 15 having an incremental rotary shaft position transducer 16 which, through a spindle logic unit 17, provides the basic link between a feedrate generator 8 and the spindle 10. The shaft position transducer 16 is mechanically geared to the spindle 10 to provide trains of pulses over lines A and B at a frequency proportional to the rotational speed of he spindle 10. The shaft position transducer 16 may also provide on a third line (not shown) one output pulse per revolution to serve as an index or reference signal for those applications where a synchronized start is required, such as for thread-cutting and thread-chasing applications.

Figure 2:
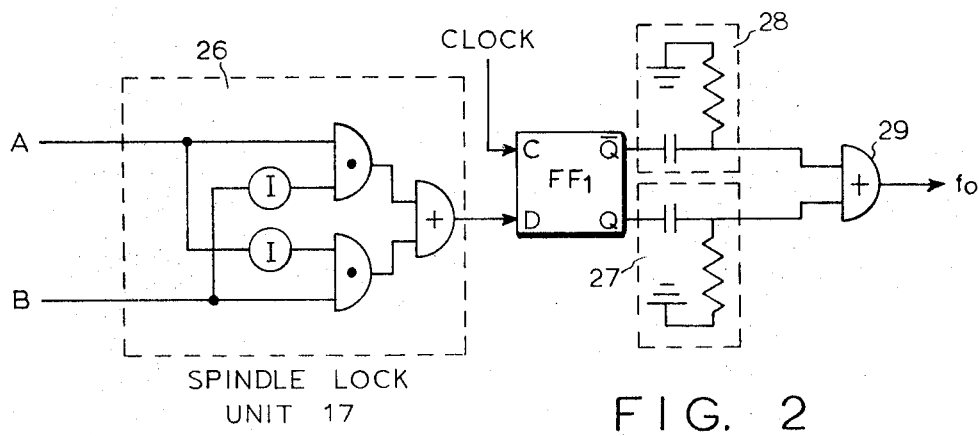
FIG. 2 is a logic diagram of a circuit required for a spindle encoder in the system of FIG. 1.

The shaft position transducer 16 produces, for example, 2,500 square waves per revolution on each of the two lines A and B, but out of phase by 90°. Thus the output from the shaft position transducer 16 is a pair of square waves shown by waveforms A and B in FIG. 3. The logic unit 17 receives these signals and converts them into a single pulse train of 10,000 pulses per revolution of the spindle 10. The manner in which that is accomplished is illustrated in FIG. 2 which will be described hereinafter.

The programmed feedrate is normally expressed in terms of inches per revolution (IPR) while the spindle encoder 15 produces a number of pulses (e.g., 10,000) per revolution of the spindle 10. The feedrate generator 18 developed an output train of pulses through a feedrate multiplier included therein, at a pulse rate dependent on the rotational speed (angular velocity) of the spindle 10 and the programmed feedrate (IPR). That pulse train is used to maintain a constant vectorial velocity of the tool 10a through a workpiece 10b independent of programmed changes in axes departures. In this exemplary embodiment, the system resolution may be, for example, 0.0001 inches; therefore, the feedrate is controlled exactly to within 0.0001 inches per revolution of the spindle 10, and the maximum feedrate to be programmed is 0.9999 inches per revolution.

Since feedrate is programmed as a modal velocity in inches per revolution, instead of a feedrate number (FRN) computed to be equal to a ratio of the desired velocity V to the vectorial distance D of the programmed departures $\Delta X$ and $\Delta Y$, it is necessary to provide the feedrate generator 18 with the reciprocal of the vectorial distance D, either as an additionally stored value in the program read by the tape reader 11 or through a computer 19 which computes (or approximates) a value D from the programmed departures $\Delta X$ and $\Delta Y$. Thus, for the purpose of illustrating an embodiment of the present invention, it is assumed that a separate computer is provided, but that is not essential to the present invention. Instead, the value D may be precomputed and stored as just suggested, or the feedrate may be stored as a feedrate number, in which case the feedrate generator does not require as an input the value D. In other words, if a feedrate number FRN is substituted for the modal velocity IPR in the control program, the feedrate generator 18 will consist of only a four-decade pulse rate multiplier having as an input a signal $f_o$ shown in FIG. 3 and as an output a train of pulses at a frequency represented by the produce $f_o \cdot FRN$.

A contour generator 20 is adapted to receive the output pulse train from the feedrate generator 18 and provide to a machine servocontrol unit 22 metered pulses $P_x$ and $P_y$ for respective x- and y-axis-control servosystems. In the exemplary embodiment of the present invention, the contour generator 20 provides a linear interpolation function using rate multipliers, as will be more fully described with reference to FIG. 4, but it should be understood that the contour generator 20 may alternatively be implemented with digital differential integrators to provide the interpolation functions. It should be further understood that either technique of implementation has a multiple-axis capability of either linear or curvilinear interpolation, as is well known to those skilled in the art. Thus the output of the contour generator 20 is a set of pulse trains $P_x$ and $P_y$, one pulse train for each axis programmed, with the number of pulses metered in each train equal to the departure programmed, and at a rate proportional to the pulse rate out of the feedrate generator 18.

The contour generator 20 also uses the pulse train from the feedrate generator 18 as a common time base for the machine control cycle. For example, if the maximum programmable move per block of data is 9.9999 inches, the number of pulses required to complete the move is 99,999, which for convenience may be selected to be 100,000. Thus 100,000 pulses from the feedrate generator 18 are counted to establish the period of a machine cycle for executing one block of commands. For example, the contour generator 20 may contain a five-decade counter to count out 99,999 pulses after it receives a "start" signal from the common control unit 14. The next pulse counted produces an "end carry" signal to terminate the metering of pulses. The end carry signal is transmitted to the common control unit 14 to call for the next block of data.

The machine servocontrol 22 accepts the pulse trains $P_x$ and $P_y$ from the contour generator 20 and produces servo signals proportional to the pulse train rates for velocity and position-change control of prime movers 23. The machine servocontrol 22 also compares commanded position references incremented by the number of pulses $P_x$ and $P_y$ metered with instantaneous servo position data provided by feedback transducers 24 and 25 for the respective axes x and y. When the differences between the commanded position references and the feedback position signals have been reduced to zero, the machine servocontrol unit 22 stops driving the machine prime movers 23. In that regard it should be noted that each of the commands $\Delta X$ and $\Delta Y$ includes a sign bit stored in the contour generator and routed through to the machine servocontrol 22 to control direction of motion.

The novel features of the present invention will now be described in greater detail with reference to FIGS. 2, 3, 4 and 5. In FIG. 2, the logic unit 17 of the system shown in FIG. 1 receives the quadrature waveforms A and B at input terminals of an EXCLUSIVE-OR network 26 which provides at its output terminal the logic function $A \cdot \bar{B} + \bar{A} \cdot B$. A D-type flip-flop $FF_1$ is synchronized by clock pulses to change state in accordance with that EXCLUSIVE-OR function of the network 26. The clock pulses shown in the third waveform of FIG. 3 may have a frequency of, for example, 2MHz.

The complementary output waveforms Q and $\bar{Q}$ of the flip-flop $FF_1$ have a frequency twice the frequency of either of the waveforms A and B. For example, if the waveforms A and B each have 2,500 square waves per revolution of the spindle 10, as noted hereinbefore, the output waveforms Q and $\bar{Q}$ of the flip-flop $FF_1$ have 5,000 square waves per revolution of the spindle 10.

Figure 3:
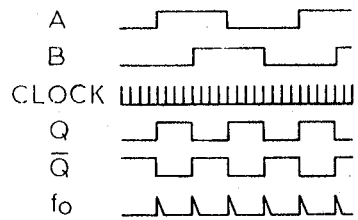
FIG. 3 is a timing diagram for the operation of the spindle encoder of FIG. 2.
Figure 4:
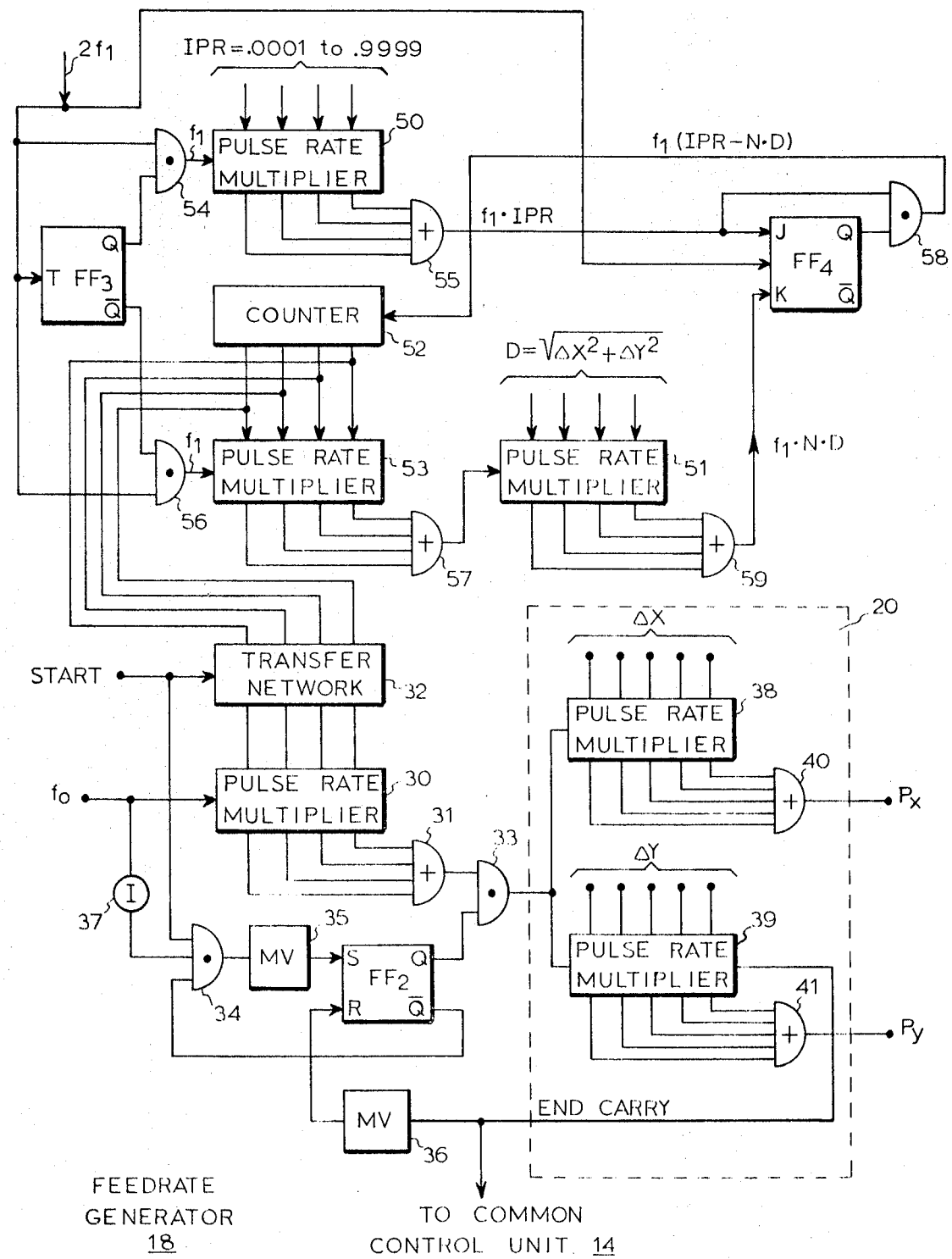
FIG. 4 is a block diagram illustrating an embodiment of a feedrate generator and contour generator shown in FIG. 1.

A pair of differentiating networks 27 and 28 cooperate with an OR gate 29 to convert the output waveforms of the flip-flop $FF_1$ into a train of pulses, one pulse for each positive transition of the waveforms Q and $\bar{Q}$. The resulting waveforms $f_o$ illustrated in FIG. 3 is applied to a decimal pulse rate multiplier 30 of the feedrate generator 18 as shown in FIG. 4 to provide at the output terminal of an OR gate 31 train of pulses at a frequency which is proportional to the product of the frequency $f_o$ and a multiplier received from a transfer network 32. If desired, or required for reliable operation of the pulse rate multiplier 30, a pulse shaper, such as a multivibrator may be included at the output of the spindle logic unit 17.

The multiplier transmitted by the transfer network 32 to the pulse rate multiplier 30 is a feedrate number FRN computed by the feedrate generator from the IPR and D values transmitted thereto in a manner described hereinbefore with reference to FIG. 1. The "start" signal from the common control unit 14 (FIG. 1) allows the transfer network 32 to transmit he computed FRN to the pulse rate multiplier 30 once sufficient time has been allowed for its computation. If the feedrate number FRN is not to be computed, but is instead stored in place of the value IPR, the "start" signal from the common control unit 14 may be programmed to occur at an earlier time after data distribution has been made. Thus, in accordance with the present invention, a spindle encoder 15 is provided in combination with a conventional feedrate generator 18 in an otherwise standard numerical control system having a conventional contour generator 19 comprising a linear interpolator as shown or a curvilinear interpolator. Either type of interpolation may be implemented with pulse rate multipliers, as shown in FIG. 4 for a linear interpolator, or digital differential integrators.

A flip-flop $FF_2$ exercises control of each interpolation cycle through an AND gate 33 which blocks pulses from the pulse rate multiplier 30 until a start signal occurs, at which time the flip-flop $FF_2$ is set through an AND gate 34 and a monostable multivibrator 35. The latter responds to the leading edge of a signal transmitted by the AND gate 34 to produce a short pulse for setting the flip-flop $FF_2$. Thereafter, the flip-flop $FF_2$ is free to be similarly reset through a monostable multivibrator 36 by an "end carry" signal produced by the contour generator 20. To insure that the flip-flop $FF_2$ will not be set in the middle of a pulse of the input signal $f_o$, the signal $f_o$ is connected to the AND gate 34 through an inverter 37.

The contour generator 20 illustrated in FIG. 4 for a two-axis control system comprises a pair of decimal pulse rate multipliers 38 and 39 which transmit pulse trains $P_x$ and $P_y$ through respective OR gates 40 and 41 at frequencies which are equal to $f_o \cdot FRN \cdot \Delta X$ for the pulse train $P_x$ and $f_o \cdot FRN \cdot \Delta Y$ for the pulse train $P_y$.

Each of the pulse rate multipliers 38 and 39 comprises five cascaded decade counters in a conventional manner for decimal frequency division; the multiplier associated with a given pulse rate multiplier consists of a five-digit decimal number. Each digit is used to gate pulses at a different frequency. The gated pulses are then combined by a buffer circuit shown schematically for purposes of illustration only as a separate OR gate.

The feedrate number applied as a multiplier to the decimal pulse rate multiplier 30 will always be less than one, and for the contour generator 20, the programmed departures must also be less than one. In a numerical control system for departure commands which may be equal to or greater than one, standard techniques for scaling he number of pulses metered during a command cycle may be employed without in any way departing from the present invention since that may be accomplished in the conventional feedrate generator and contour generator arrangements illustrated in FIG. 4.

Each command cycle is timed by using the decade counters of the pulse rate multiplier 39 in the contour generator 20 to count pulses of the pulse train $f_o$ metered by the rate multiplier 30. Assuming the number of pulses required to complete a maximum programmable move is 99,999 pulses, 100,000 is selected as the standard number of pulses per cycle, as suggested hereinbefore, the five-decade counters of the pulse rate multiplier 39 will allow counting 100,000 pulses. After 99,999 pulses have been counted, the next pulse transmitted through the gate 33 will cause a carry signal to be propagated from the pulse rate multiplier 39. That carry signal is employed to terminate the cycle and is therefore commonly referred to as an "end carry" signal. As the frequency of the signal $f_o$ increases, due to an increase in rotational speed of the spindle 10 (FIG. 1), the time required to move the cutting tool 10a a given distance relative to the workpiece will automatically decrease; therefore the time to produce an " end carry" signal is decreased by the higher frequency of the signal $f_0$. Similarly, as the feedrate number increases, the time of a cycle decreases because of the operation of the rate multiplier 30. This technique of producing "end carry" signals is standard in some systems in commercial use.

The manner in which a feedrate number is computed in the illustrated embodiment of the present invention will now be described with reference to FIG. 4. The modal velocity in inches per revolution is transferred to a decimal rate multiplier 50 by the data distribution unit 12 (FIG. 1). Similarly, the vectorial distance D of the incremental departures $\Delta X$ and $\Delta Y$ is transferred to a decimal rate multiplier 51 from the D computer 19 under control of the common control unit 14 after the D computer 19 has computed the vectorial distance D from the incremental departures $\Delta X$ and $\Delta Y$. The computation may be accomplished in a straightforward manner by deriving the square root of the sum of the separate incremental departures squared, but may be derived in any other manner from the incremental departures $\Delta X$ and $\Delta Y$. The decimal pulse rate multipliers 50 and 51 cooperate with a decimal counter 52 and a decimal pulse rate multiplier 53 to form in the decimal counter 52 a number which is equal to the ratio of the modal velocity IPR to the vectorial distance D, which number is by definition the feedrate number required by the pulse rate multiplier 30. That is accomplished by gating pulses at a first frequency $f_1$ through an AND gate 54. The frequency of pulses transmitted by the pulse rate multiplier 50 through an OR gate 55 is then equal to the product $f_1 \cdot IPR$. Pulses at the same frequency $f_1$ are gated through an AND gate 56, but out of phase with pulses transmitted through the gate 54 as controlled by a T-type flip-flop $FF_3$ which toggles, i.e. functions as a binary circuit in response to clock pulses at a frequency $2f_1$ from the timing generator 13 (FIG. 1).

Initially, the decimal counter 52 is reset to zero by a reset circuit (not shown) which resets all of the internal decade counters of the pulse rate multipliers 50, 51 and 53 just before the IPR and D values are entered under control of the common control unit 14. Consequently, the output of the pulse rate multiplier 53 provided by an OR gate 57 will initially have a frequency of zero. However, almost immediately a JK-type flip-flop $FF_4$ is set by a clock pulse which occurs in time coincidence with a pulse from the OR gate 55. Once the flip-flop $FF_4$ is set, an AND gate 58 having one terminal connected to the Q output terminal of the flip-flop $FF_4$ will gate pulses from the OR gate 55 to the decimal counter 52.

Once the decimal counter 52 receives pulses from the AND gate 58, the multiplier for the pulse rate multiplier 53 increases from zero to cause pulses to be transmitted through the OR gate 57 to the decade counters of the pulse rate multiplier 51. Thus the frequency at the output of the OR gate 57 is the product $N \cdot f_1$ where N is a number in the decimal counter 52, and the frequency of a train of pulses at the output of an OR gate 59 is the product $f_1 \cdot N \cdot D$.

Since the pulses gated through the AND gate 56 to produce the train of pulses at the frequency $f_1 \cdot N \cdot D$ is out of phase with the pulses gated through the AND gate 54 to produce the train of pulses at the frequency $f_1 \cdot IPR$, the J and K input terminals of the flip-flop $FF_4$ will receive pulses from the OR gates 55 and 59 out of phase. Accordingly, once a pulse is transmitted through the OR gate 59, the flip-flop $FF_4$ is reset. Therefore, the next pulse transmitted through the OR gate 55 cannot pass through the AND gate 58, but can cause the flip-flop $FF_4$ to be set again. Then if another pulse is transmitted through the OR gate 55 before a pulse is transmitted through the OR gate 54 (because the frequency $f_1 \cdot IPR$ is greater than the frequency $f_1 \cdot N \cdot D$), the decimal counter 52 is further incremented to increase the number N, thereby increasing the frequency of pulses transmitted through the OR gate 59.

The process continues until the frequency $f_1 \cdot N \cdot D$ is equal to the frequency $f_1 \cdot IPR$. At that time the product $N \cdot D$ is equal to the modal velocity IPR, therefore the number N is the feedrate number FRN required for maintaining the vectorial velocity of a tool 10a constant.

Since the time required to compute the feedrate number FRN will vary, the common control unit 14 is programmed to allow the maximum time required before it transmits a start pulse to the transfer network 32 for transfer of the computed feedrate number FRN to the pulse rate multiplier 30. In practice, the pulse rate multiplier 30 may not have an internal register for storing the FRN number. If not, the transfer network 32 must be provided with a storage register. That may be accomplished by providing a D-type flip-flop in the network 32 for each bit position of each of four decade counters in the decimal counter 52. A start signal at the clock terminal of all those flip-flops will then cause the computed number FRN to be entered into the transfer network 32 for storage therein.

Once the command cycle has been completed, the transfer network 32 may be reset by the "end carry" signal, but that is not necessary since a new FRN will replace the current FRN when the next "start" signal occurs for the next cycle which is, of course, initiated by the common control unit 14 only after it receives an "end carry" signal from the contour generator 20 as shown in FIG. 1.

Figure 5:
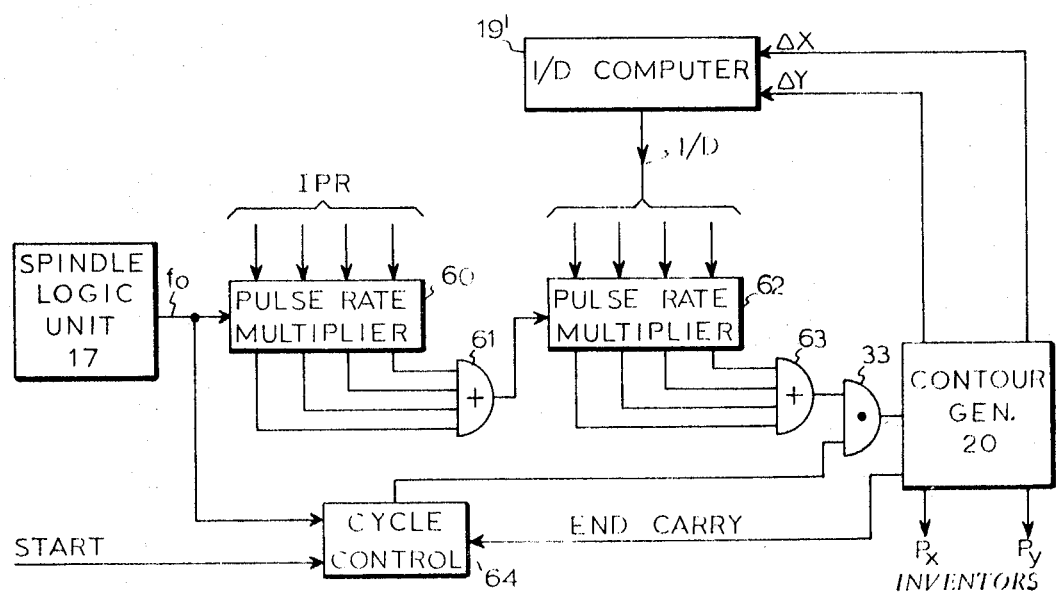
FIG. 5 is a block diagram illustrating a second embodiment of a feedrate generator and contour generator shown in FIG. 1.

A second embodiment will now be described with reference to FIG. 5. Since the function of the feedrate generator 18 (FIG. 1) is to provide a pulse train at a frequency $f_0 \cdot$FRN, where FRN is the ratio of V (programmed as IPR) to D, it is possible to multiply the frequency $f_0$ of pulses from the spindle logic unit 17 directly by IPR in a pulse rate multiplier 60. The frequency $f_0 \cdot$IPR of pulses combined by an OR gate 61 is then multiplied directly by the reciprocal of D in a pulse rate multiplier 62. In that manner the frequency of pulses combined by an OR gate 63 is the product of the frequency $f_0$ and the ratio of V to D.

Pulses from the OR gate 63 are not transmitted to the contour generator 20 until a start signal has set a cycle control unit 64 to enable the AND gate 33 in the same manner as described hereinbefore for the first embodiment of FIG. 4. An "end carry" signal resets the cycle control unit 64 when a number of pulses have been transmitted for each of the x and y axes equal to corresponding numerical control data.

From the foregoing it may be readily appreciated that considerable simplification can be achieved in the feedrate generator 18 of FIG. 1 over the embodiment illustrated in FIG. 4 if the reciprocal of D is provided as by a D-computer 19' modified to compute the reciprocal of D as a further operation once the value D has been computed.

It should also be appreciated that an improved system has been disclosed for controlling the frequency of basic feedpulses to a feedrate generator in a numerical control system as a function of spindle speed. In that manner feedrate is controlled as a function of spindle speed as well as programmed velocity and vectorial departure D. While the invention has been described in a particular exemplary environment, it is recognized that other environments or operating requirements may require arrangements for the feedrate generator 18 and contour generator 20 different from those shown in the representative numerical control system of FIG. 4.

The embodiments of the invention in which an exclusive property or privilege is claimed are defined as follows:

1. A method for controlling the relative tool traverse velocity of a machine having a spindle, said machine having a mechanism which moves a tool in a plurality of orthogonal directions relative to a workpiece in incremental steps, a step in a direction along a given axis being made in response to a pulse received to command motion in that direction, comprising:
   generating a first signal having a value proportional to angular velocity of said spindle;
   generating a second signal having a value proportional to a ratio of desired vectorial velocity of said mechanism to the vectorial distance said mechanism is to move in response to programmed motions along said axes;
   multiplying said first and second signals to obtain a product signal proportional to both angular velocity of said spindle and said ratio; and
   varying the rate at which pulses are delivered to said mechanism in accordance with the value of said product signal.

2. A method as defined in claim 1 wherein said first, second and product signals are waveforms having pulses and the values of said first, second and product signals are pulse repetition rates thereof, and said step of varying the rate at which pulses are delivered to said mechanism comprises metering a number of pulses of said product signal to said mechanism for each of said axes equal to corresponding numerically programmed data.

3. A method as defined in claim 2 wherein said desired vectorial velocity is programmed in units per revolution of said spindle.

4. In apparatus for controlling the tool traverse velocity of a machine having means for producing relative rotary motion between a cutting tool and a workpiece, and means for moving said tool linearly relative to said workpiece in a plurality of directions orthogonal to each other, said linear motions being commanded in specified distances along said directions while said rotary motion is continued without interruptions, the combination comprising:
   means for producing a continuous pulse train having a pulse rate proportional to angular velocity of said rotary motion;
   means for receiving in digital form a desired modal velocity value of said tool relative to said workpiece in units of linear motion per revolution of said rotary motion;
   means for producing in digital form a vectorial value proportional to the vectorial sum of motions called for by commanded linear motions along said orthogonal directions;
   means for multiplying said continuous pulse train by said modal velocity value and said vectorial value to produce a feedrate pulse train having a pulse rate proportional to the ratio of said modal velocity to the vectorial sum of motions called for by commanded linear motions; and
   means responsive to said feedrate pulse trains for producing a set of pulse trains, one train for each direction of commanded linear motion, a given train having a number of pulses proportional to the distance of motion commanded in a given direction.

5. The combination of claim 4 wherein said vectorial value proportional to the vectorial sum of motions called for by commanded linear motions along said orthogonal directions is equal to the reciprocal of said vectorial sum of motions, and said multiplying means comprising two cascaded pulse-rate-multiplying means, one for multiplying by said modal velocity value and one for multiplying by said vectorial value.

6. The combination of claim 4 wherein said vectorial value proportional to the vectorial sum of motions called for by commanded linear motions along said orthogonal directions is equal to the vectorial sum, and said multiplying means comprises:
   means responsive to said modal velocity value and said vectorial value for producing in a digital form a feedrate equal to the ratio of said modal velocity value to said vectorial sum;
   and a pluse-rate-multiplying means for multiplying said continuous pulse train by said feedrate number.

7. In a numerical control system for a machine having a spindle for producing relative rotary motion between a tool and a workpiece in response to programmed departures and modal velocities expressed in terms of linear distance per revolution, the combination comprising:
   means for numerically programming relative linear motions between said spindle and said tool along a plurality of axes during successive machine cycles;
   means for computing a value proportional to the linear distance said tool must travel during a given machine cycle in response to said programmed departures, said distance being the vectorial sum of vectors defined by said programmed departures along predetermined axes;
   means for producing a basic train of pulses at a rate proportional to the angular velocity of said spindle;
   means for computing a feedrate number equal to a ratio of programmed modal velocity to said linear distance said tool must travel during a given machine cycle;
   means for multiplying the rate of said basic train of pulses by said feedrate number to produce a train of feedrate pulses; and
   means responsive to said train of feedrate pulses from said multiplying means for establishing the period of said given machine cycle in proportion to the frequency of said feedrate pulses, and for simultaneously metering out a number of said feedrate pulses for each of said axes of motion proportional to programmed linear motion data for respective ones of said axes.

8. In apparatus for controlling the relative tool traverse velocity of a machine having a spindle, said machine having a mechanism which moves a tool in a plurality of orthogonal directions relative to a workpiece in incremental steps, a step in a direction along a given axis being made in response to a pulse received to command motion in that direction, the combination comprising:

means for generating a first signal having a value proportional to angular velocity of said spindle;

means for generating a second signal having a value proportional to a ratio of desired vectorial velocity of said mechanism to the vectorial distance said mechanism is to move in response to programmed motions along said axes;

means for multiplying said first and second signals to obtain a product signal proportional to both angular velocity of said spindle and said ratio; and means for varying the rate at which pulses are delivered to said mechanism in accordance with the value of said product signal.

9. The combination as defined in claim 8 wherein said first, second and product signals are waveforms having pulses and the values of said first, second and product signals are pulse-repetition rates thereof, and said means for varying the rate at which pulses are delivered to said mechanism comprises means for metering a number of pulses of said product signal to said mechanism for each of said axes equal to corresponding numerically programmed data.

10. The combination as defined in claim 9 wherein said desired vectorial velocity is programmed in units per revolution of said spindle.

PO-1050
(5/69)

UNITED STATES PATENT OFFICE
CERTIFICATE OF CORRECTION

Patent No. 3,612,841          Dated October 12, 1971

Inventor(s) Marion Kosem, Clive P. Hohberger

It is certified that error appears in the above-identified patent and that said Letters Patent are hereby corrected as shown below:

| | | |
|---|---|---|
| Abstract, Line 6 | "model" should read --modal-- |
| Column 1, Line 29 | "he" should read --the-- |
| Column 1, Line 31 | "The" should read --of-- (first occurrence) |
| Column 1, Line 53 | Insert --a-- before "cutting tool" |
| Column 3, Line 3 | "8" should read --18-- |
| Column 3, Line 7 | "he" should read --the-- |
| Column 4, Line 55 | Insert --a-- before "train" |
| Column 4, Line 67 | "he" should read --the-- |
| Column 5, Line 38 | "he" should read --the-- |

Signed and sealed this 20th day of March 1973.

(SEAL)
Attest:

EDWARD M. FLETCHER, JR.           ROBERT GOTTSCHALK
Attesting Officer          Commissioner of Patents